(12) United States Patent
Schlesener et al.

(10) Patent No.: US 7,631,410 B2
(45) Date of Patent: Dec. 15, 2009

(54) SNAP-IN FLOATING HINGE CAP FOR PORTABLE COMPUTER

(75) Inventors: Maria C. Schlesener, Lago Vista, TX (US); Jefferson W. Wirtz, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 341 days.

(21) Appl. No.: 11/743,890

(22) Filed: May 3, 2007

(65) Prior Publication Data
US 2007/0201200 A1    Aug. 30, 2007

Related U.S. Application Data

(62) Division of application No. 10/899,915, filed on Jul. 27, 2004, now Pat. No. 7,239,504.

(51) Int. Cl.
*B23P 11/00* (2006.01)
*G06F 1/16* (2006.01)

(52) U.S. Cl. .............................. 29/434; 29/450; 29/451

(58) Field of Classification Search ................ 16/250, 16/261, 271; 248/917; 361/679, 680, 681, 361/682, 683; 29/434, 446, 448, 450, 451
See application file for complete search history.

(56) References Cited

U.S. PATENT DOCUMENTS

| | | | |
|---|---|---|---|
| 5,173,837 A | 12/1992 | Blackwell et al. | |
| 5,381,920 A | 1/1995 | Lin | |
| 5,507,072 A | 4/1996 | Youn | |
| 5,724,704 A | 3/1998 | Seo | |
| 5,771,540 A | 6/1998 | Carpenter et al. | |
| 5,796,576 A | 8/1998 | Kim | |
| 5,896,622 A * | 4/1999 | Lu | 16/342 |
| 6,170,120 B1 * | 1/2001 | Lu | 16/342 |
| 6,219,230 B1 | 4/2001 | Cho | |
| 6,230,365 B1 * | 5/2001 | Lu | 16/342 |
| 6,317,315 B1 | 11/2001 | Lee et al. | |
| 6,470,532 B2 | 10/2002 | Rude | |
| 6,754,081 B2 | 6/2004 | Rude et al. | |
| 6,977,810 B2 | 12/2005 | Song | |
| 7,205,475 B2 * | 4/2007 | Jiang et al. | 174/50 |
| 7,239,504 B2 * | 7/2007 | Schlesener et al. | 361/679.09 |
| 7,324,092 B2 | 1/2008 | Lin et al. | |
| 2006/0023408 A1 | 2/2006 | Schlesener et al. | |

* cited by examiner

*Primary Examiner*—Essama Omgba
(74) *Attorney, Agent, or Firm*—Haynes and Boone, LLP

(57) ABSTRACT

A method of assembling a portable information handling system such as a laptop computer includes a chassis having a pivotally mounted top. The top and chassis are connected by a hinge. A hinge cap is releasably attached directly to the hinge and the hinge is mounted on the chassis so that the hinge cap seats in and defines a gap with a cover plate on the chassis.

6 Claims, 12 Drawing Sheets

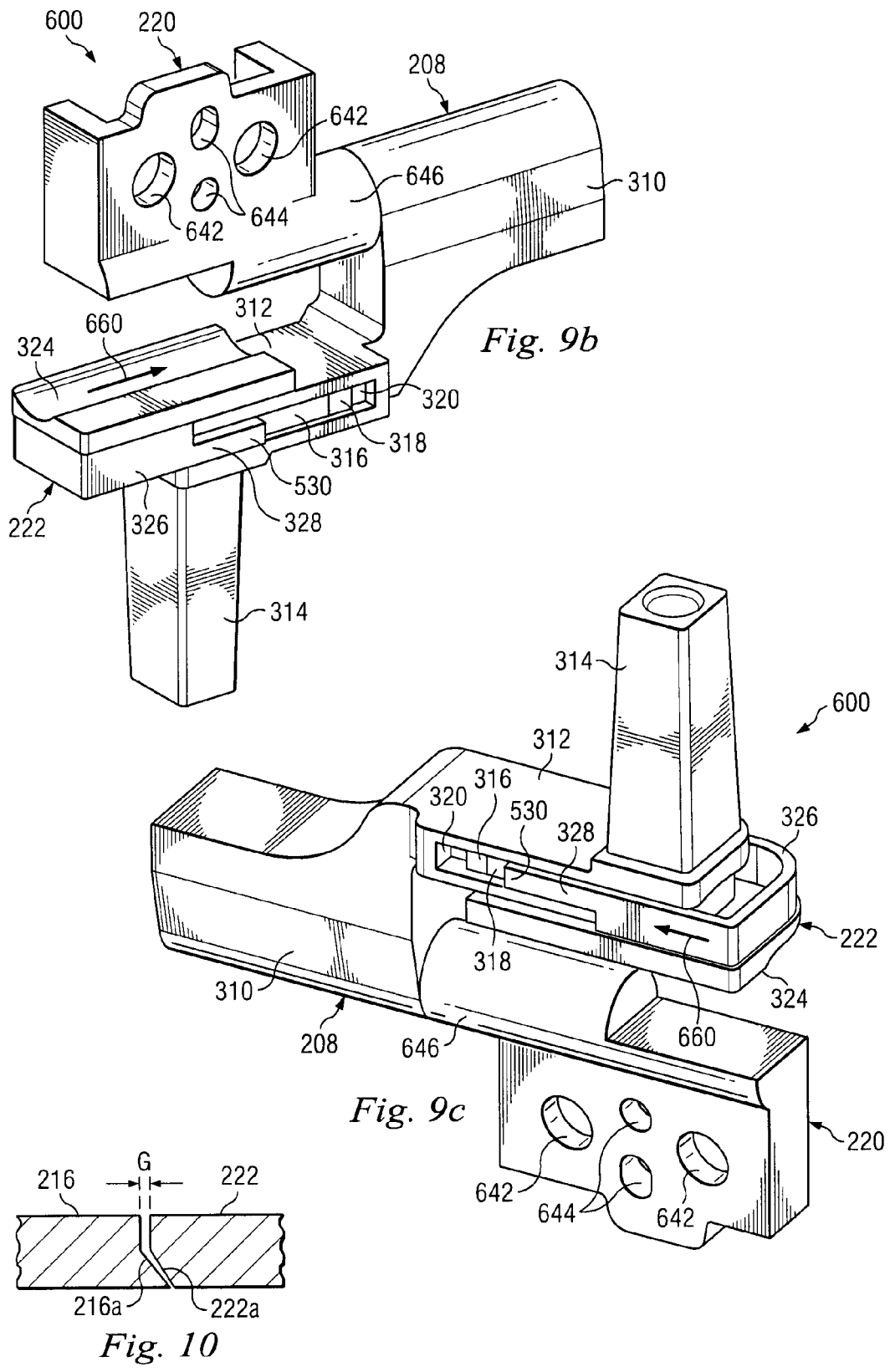

SNAP-IN FLOATING HINGE CAP FOR PORTABLE COMPUTER

CROSS-REFERENCE TO RELATED APPLICATION

This application claims priority to and is a divisional of co-owned U.S. patent application Ser. No. 10/899,915 filed Jul. 27, 2004 now U.S. Pat. No. 7,239,504, which is incorporated herein by reference in its entirety.

BACKGROUND

The description herein relates generally to portable computers, and more particularly to portable computer hinge caps.

Portable laptop or notebook computers include a base and a top which is pivotally connected to the base at a hinged connection. When the top is raised, a display panel such as a liquid crystal display (LCD) panel mounted therein is exposed. The top of a portable computer is typically connected to the base by a hinge on one edge and by at least one latch located on at least one other edge. When unlatched, the top is rotated open thus exposing a keyboard on the base and the LCD panel mounted in the top. The latch which secures the base and top is typically mounted along an edge of the top.

Some hinge assemblies have been provided with clutch mechanisms. Such clutch mechanisms can include a friction component and a torsion spring component. The spring counteracts the weight of the display housing when the display housing is open, such that the friction component need only be strong enough to support the open display housing during times when the computer is subjected to vibration or the like.

The clutch assemblies may be covered with hinge caps which are often used when a chassis has clutch assemblies that reside in the far end corners of the chassis and are positioned adjacent the LCD display. One disadvantage of current hinge caps is that they are separate parts which often become loose resulting in movement and noise when the top portion is rotated open or closed. In some cases, the hinge caps can fall off or break off. There may also be alignment issues with mating parts resulting in fit and finish problems.

Some hinge caps are glued or heat staked into the chassis or the clutch. The glue may not adhere to mating metal parts due to machine oil or internal lubrication contamination. Heat stakes may break off or fall off if they become loose.

Accordingly, what is needed is a hinge cap solution which is free of the disadvantages described above.

SUMMARY

In one embodiment, accordingly, there is disclosed a method of assembling a portable information handling system including a chassis, a hinge connected to the chassis, a top panel pivotally connected to the chassis by the hinge, and a hinge cap releasably connected directly to the hinge.

BRIEF DESCRIPTION OF THE DRAWINGS

FIGS. 9a, 9b and 9c are perspective views of an embodiment of a hinge assembly suitable for use with a portable information handling system.

FIG. 10 is a partial cross-sectional view illustrating an embodiment of mating surfaces of a hinge cap and a chassis cover plate.

DETAILED DESCRIPTION

For purposes of this disclosure, an information handling system ("IHS") includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. Example of an IHS include, personal computer ("PC"), a network storage device, personal digital assistant, or any other suitable device with variations in size, shape, performance, functionality, and price. An IHS also includes other components such as, random access memory ("RAM"), one or more processing resources (e.g., central processing unit ("CPU"), hardware or software control logic, read only memory ("ROM"), other types of memory, one or more disk drives, one or more network interfaces, one or more input/output devices and/or one or more buses.

Figure 1:
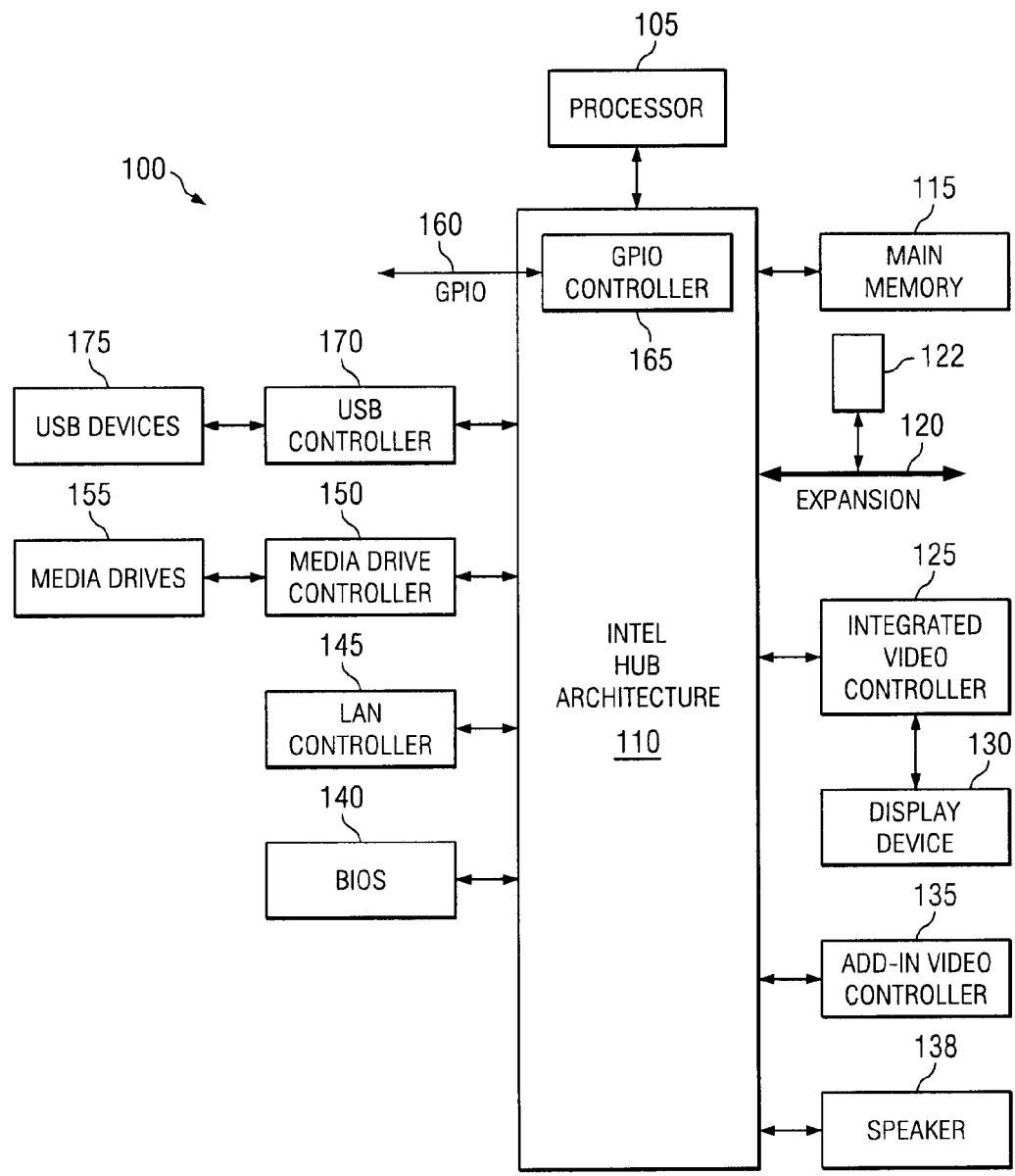
FIG. 1 is a block diagram of an embodiment of an information handling system ("IHS").
Figure 2A:
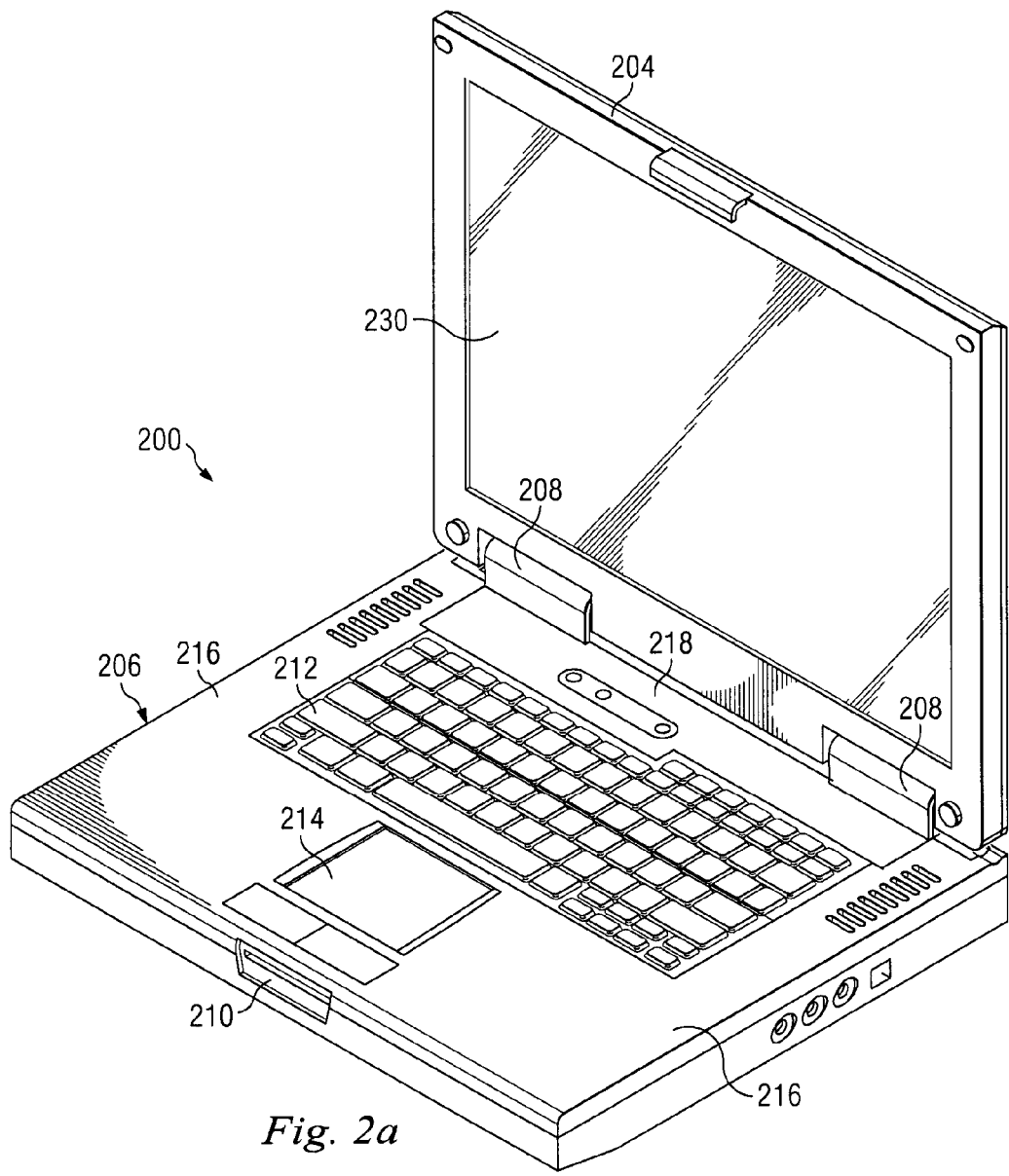
FIGS. 2a and 2b are perspective views of an embodiment of a portable information handling system.
Figure 2B:
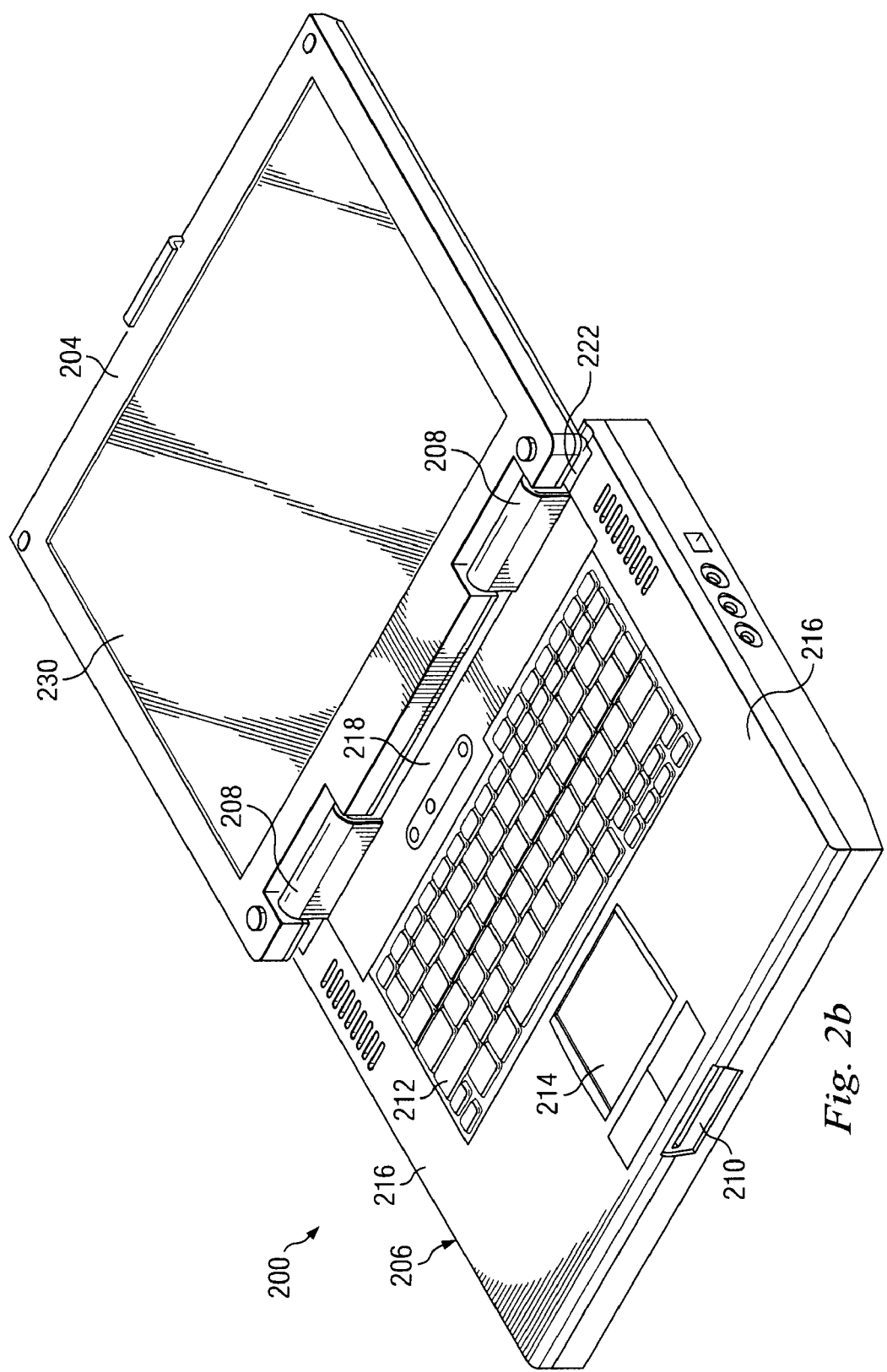
Figure 3A:
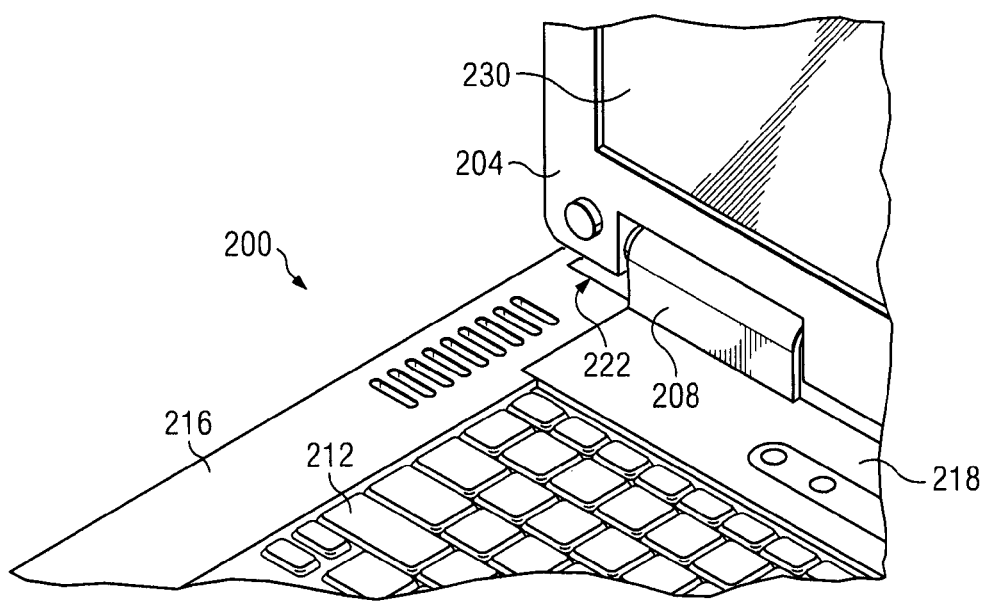
FIGS. 3a and 3b are perspective views of an embodiment of a portion of a portable information handling system.
Figure 3B:
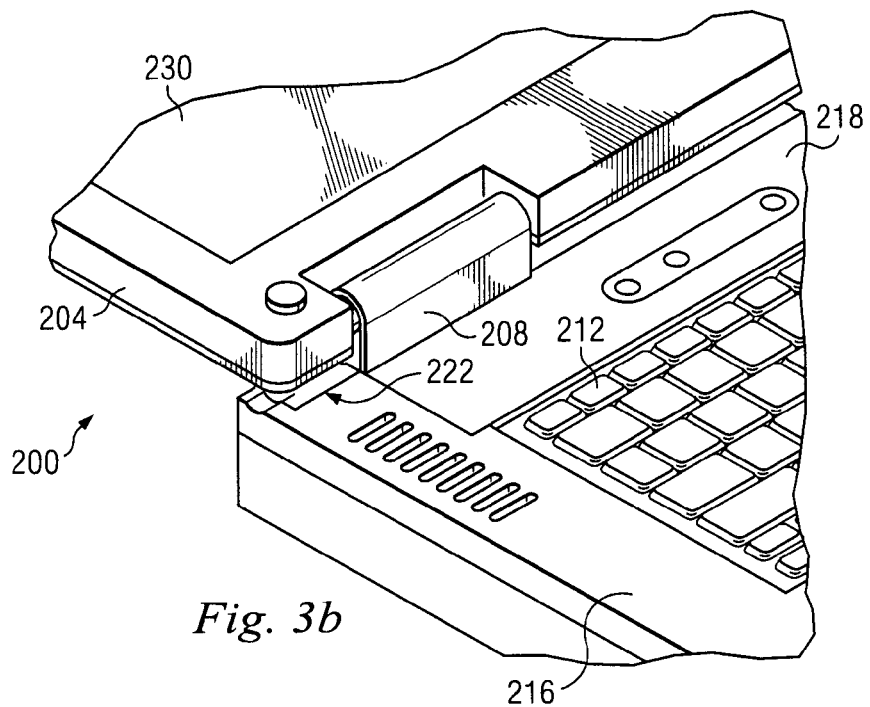

FIG. 1 is a block diagram of an IHS indicated generally at 100, according to one embodiment. IHS 100 includes processor 105 (e.g., an Intel Pentium series processor). Intel Hub Architecture (IHA) chipset 110 provides IHS 100 with graphics/memory controller hub functions and I/O functions. More specifically, IHA chipset 110 acts as a host controller which communicates with integrated video controller 125 coupled thereto. Display device 130 is coupled to the integrated video controller 125 (e.g., on-board video controller). Although display device 130 is coupled to integrated video controller 125 as shown in FIG. 1, display device 130 is also capable of being coupled instead to add-in video controller 135. Add-in video controller 135 may be an advanced graphics port ("AGP") video controller, or alternatively, any other suitable video controller such as Peripheral Component Interconnect ("PCI") video controller or PCI Express video controller. Add-in video controller 135 includes a video connection interface such as a digital video connection interface (e.g., a Digital Visual Interface ("DVI")) or an analog video interface in this particular embodiment.

Chipset 110 further acts as a controller for main memory 115 which is coupled thereto. Chipset 110 also acts as an input/output ("I/O") controller hub (ICH) which performs I/O functions. General purpose input/output ("GPIO") 160 is coupled to chipset 110 via GPIO controller 165. USB controller 170 is coupled to chipset 110 so that devices such as USB devices 175 can be connected to chipset 110 and processor 105. USB devices 175 include, for example, floppy disk drives, CD-ROM drives, DVD-ROM drives and other devices which support the USB standard. System basic input-output system ("BIOS") 140 is coupled to chipset 110, as shown. BIOS 140 is stored in CMOS or FLASH memory so that it is nonvolatile.

Local area network (LAN) controller 145, alternatively called a network interface controller (NIC), is coupled to chipset 110 to facilitate connection of IHS 100 to other information handling systems. Media driver controller 150 is coupled to chipset 110 so that devices such as media drives 155 can be connected to chipset 110 and processor 105. Examples of media drives 155 capable of being coupled to the media controller 150 include CD-ROM drives, DVD drives, hard disk drives and other fixed or removable media drives. Expansion bus 120, such as a PCI bus, PCI Express bus, serial advanced technology attachment (SATA) bus or other bus is coupled to the chipset 110 as shown. Expansion bus 120 includes one or more expansion slots 122 for receiving expansion cards which provide IHS 100 with additional functionality. IHS 100 also includes speaker (e.g., loudspeaker) 138 for outputting audio signals. Speaker 138 is coupled to chipset 110.

In one embodiment, illustrated in FIGS. 2a, 2b, 3a, and 3b, IHS 100 is a portable IHS 200. Portable IHS 200 includes a top panel 204 hingedly connected to a chassis 206 by a pair of hinges 208. Because the hinges 208 are similar, only one will be described in detail. Chassis 206 includes a latch 210 to secure top panel 204 to chassis 206 in a closed position. Chassis 206 also includes a keyboard 212, a mousepad 214, a chassis cover plate portion 216, which may include a palmrest portion adjacent the keyboard 212, and a hinge cover 218. Top panel 204 has an LCD display 230 mounted therein.

A hinge cap 222 is provided for each hinge 208 adjacent chassis cover plate portion 216. The hinge cap 222 provides an aesthetic appearance to chassis 206.

Referring now to FIGS. 4a, 4b, 4c, and 4d, portable IHS 200 is illustrated with hinge cover 218 removed. Top panel 204 is connected to chassis 206 by hinges 208. A clutch assembly 220 is rotatably connected to each hinge 208. Clutch assembly 220 is connected to top panel 204 with screws (not shown) covered by a screw cover 232, and hinges 208 are connected to chassis 206, for example with a screw. Clutch assembly 220 rotates within each hinge 208 to allow top panel 204 to move from an open to a closed position, and vice versa.

A portion of each hinge 208 is within chassis 206, and is covered by a hinge cap 222. With hinge cover 218 removed, a portion of a circuit board 240 is visible.

Referring now to FIGS. 5a, 5b, 5c, 5d, top panel 204 and hinges 208 are illustrated after having been removed from chassis 206. Each clutch assembly 220 is rigidly connected to top panel 204 by screw 234. Each clutch assembly 220 is rotatably connected to each hinge 208, respectively. Each hinge cap 222 is releasably connected to each hinge 208 respectively. Top panel 204 is provided with positioning pins 236, which are received within corresponding holes of clutch assembly 220.

Figure 6:
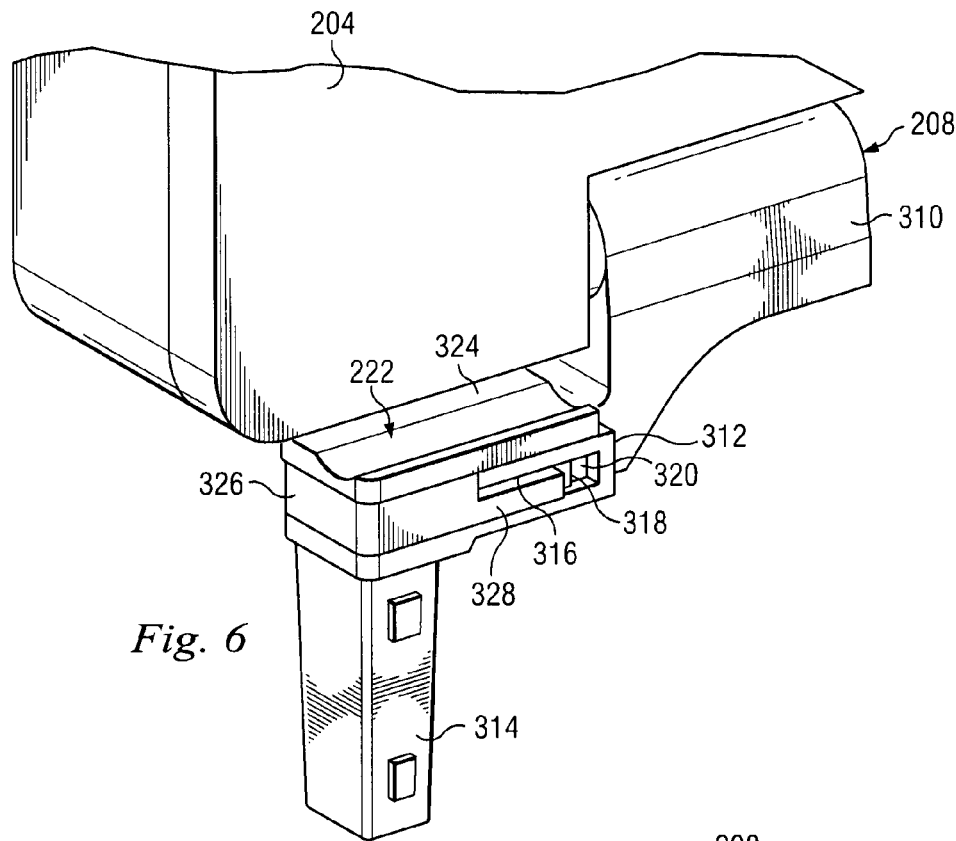

Referring now to FIG. 6, top panel 204 and hinge 208 of a portable IHS are illustrated. Each hinge 208 includes a top portion 310, a middle portion 312, and a post portion 314. In one embodiment, top portion 310 may be hingedly connected to top panel 204, for example with a clutch assembly. Middle portion 312 includes a pair of opposed grooves 316, each having a protrusion 318, and a female connector 320.

Hinge cap 222 is releasably attached to middle portion 312. Hinge cap 222 includes a cosmetic top portion 324 and a bottom portion 326. Bottom portion 326 includes a pair of deflectable arm portions 328 which are received within groove 316 of middle portion 312. Each deflectable arm portion 328 includes a male connector (not shown) which can slide through groove 316 and over protrusion 318 by bending deflectable arm portion 328, and then be received by female connector 320. To release hinge cap 222 from hinge 208, deflectable arm portion 328 can be bent outwards to disengage the male connector from female connector 320, and then can slide out of groove 316.

Figure 7:
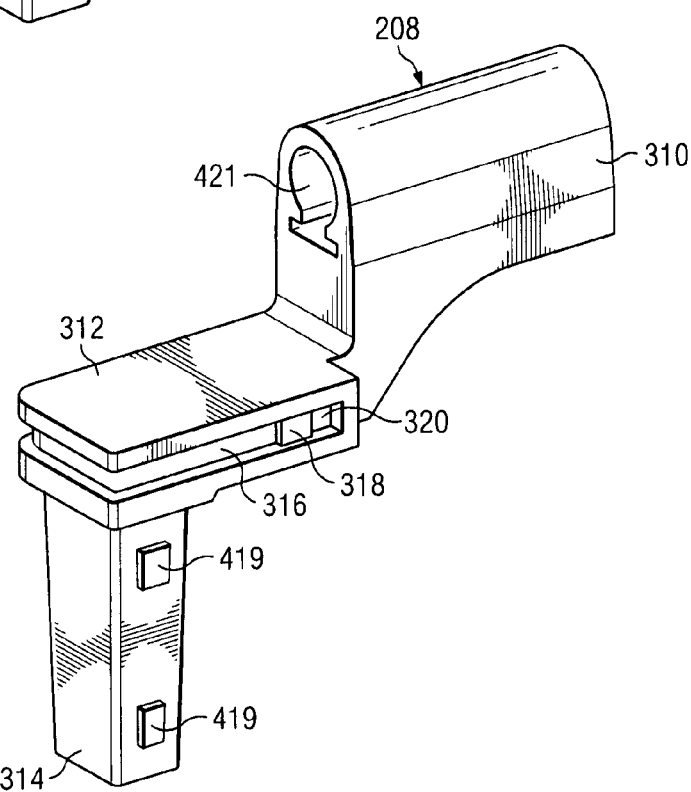
FIG. 7 is a perspective view of an embodiment of a hinge suitable for use with a portable information handling system.

Referring now to FIG. 7, hinge 208 is illustrated. Hinge 208 includes top portion 310, middle portion 312, and post portion 314. Top portion 310 includes a cylindrical opening 421, adapted to receive an axle, for example a clutch assembly, to connect top portion 310 to a portable IHS chassis or top panel. Middle portion 312 includes opposed grooves 316. Grooves 316 each include protrusion 318 and female connector 320, adapted to receive a male connector. Post portion 314 includes connectors 419, adapted to connect to a portable IHS chassis or top panel.

Figure 8:
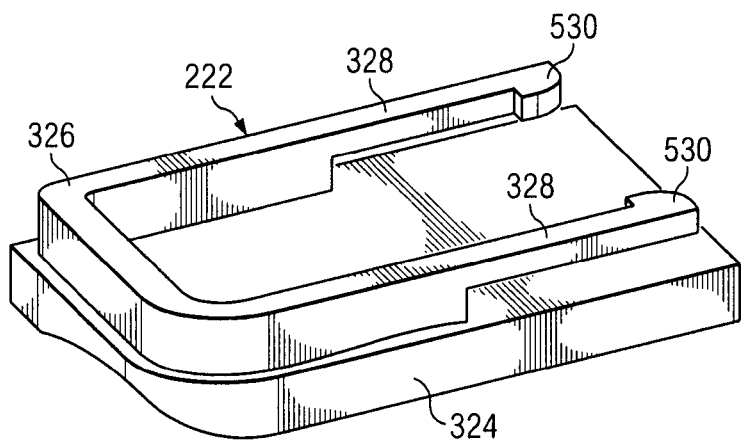
FIG. 8 is a perspective view of an embodiment of a hinge cover suitable for use with a portable information handling system.

Referring now to FIG. 8, hinge cap 222 is illustrated. Hinge cap 222 includes cosmetic top portion 324 and bottom portion 326. Bottom portion 326 includes deflectable arm portions 328, having a pair of male connectors 530, respectively. Arm portions 328 are adapted to be received within grooves 316, and male connectors 530 are adapted to be received within female connectors 320, as described above.

Figure 9A:
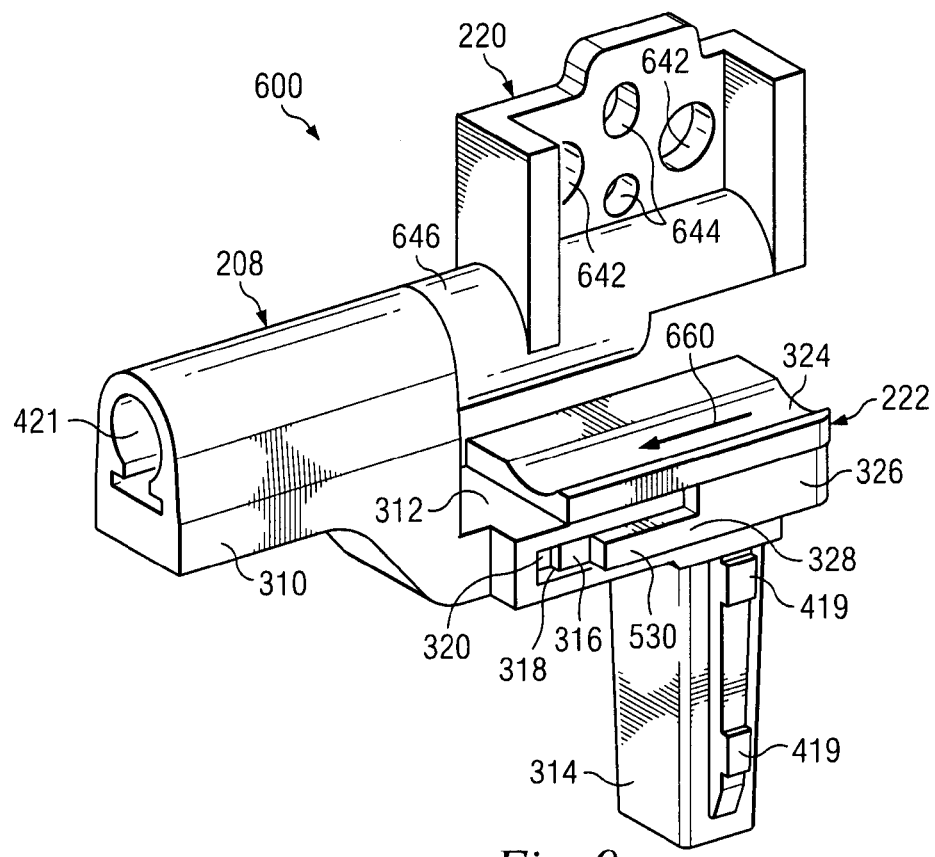

Referring now to FIGS. 9a, 9b, and 9c, hinge assembly 600 is illustrated. Hinge assembly 600 includes hinge 208, hinge cap 222, and clutch assembly 220.

Hinge 208 includes top portion 310, middle portion 312, and post portion 314. Top portion 310 includes cylindrical opening 421. Middle portion 312 includes grooves 316. Grooves 316 include protrusions 318 and female connectors 320. Post portion 314 includes connectors 419, adapted to connect to a portable IHS chassis or top panel.

Hinge cap 222 includes cosmetic top portion 324 and bottom portion 326. Bottom portion 326 includes deflectable arm portions 328. Deflectable arm portions 328 are adapted to be received within grooves 316, respectively. Deflectable arm portions 328 include male connectors 530, adapted to be received by female connectors 320, respectively.

Clutch assembly 220 includes screw holes 642 and positioning pin holes 644, adapted to connect clutch assembly 220 to a portable IHS chassis or top panel. Clutch assembly 220 also includes shaft 646 received within cylindrical opening 421. Shaft 646 rotates within cylindrical opening 421 to allow clutch assembly 220 to rotate relative to hinge 208.

Figure 4A:
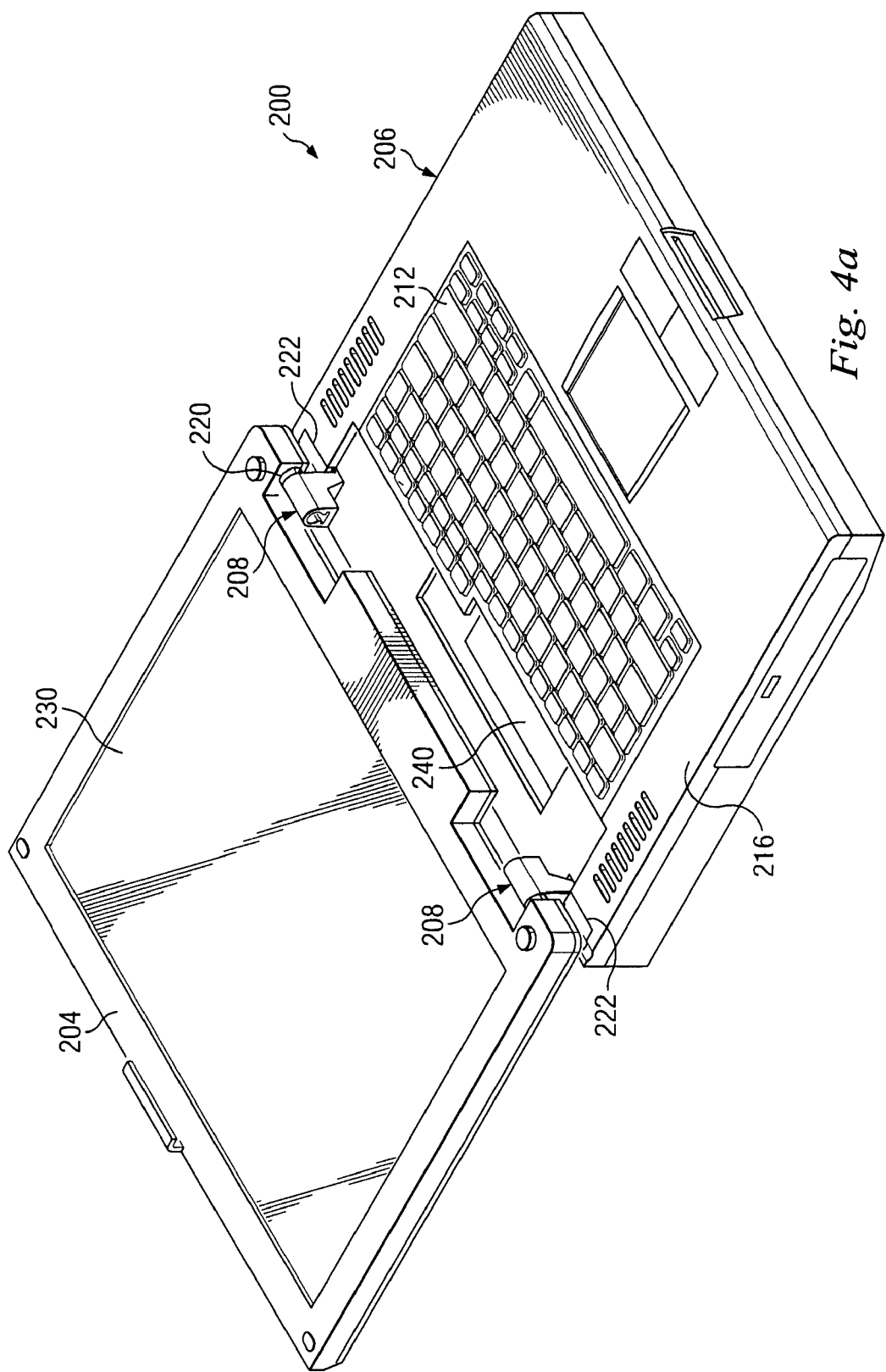
FIG. 4a is a perspective view of an embodiment of a portable information handling system.
Figure 4B:
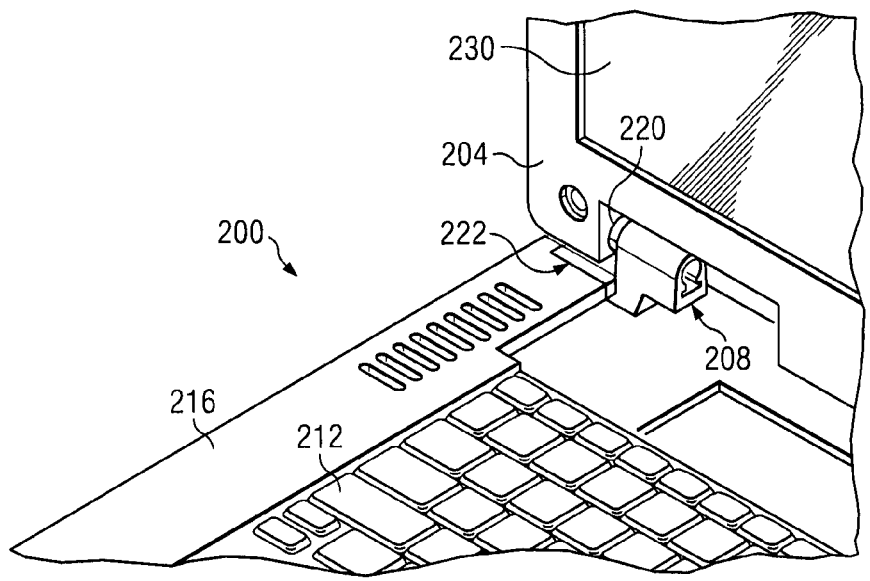
FIGS. 4b, 4c and 4d are perspective views of an embodiment of a portion of a portable information handling system.
Figure 4C:
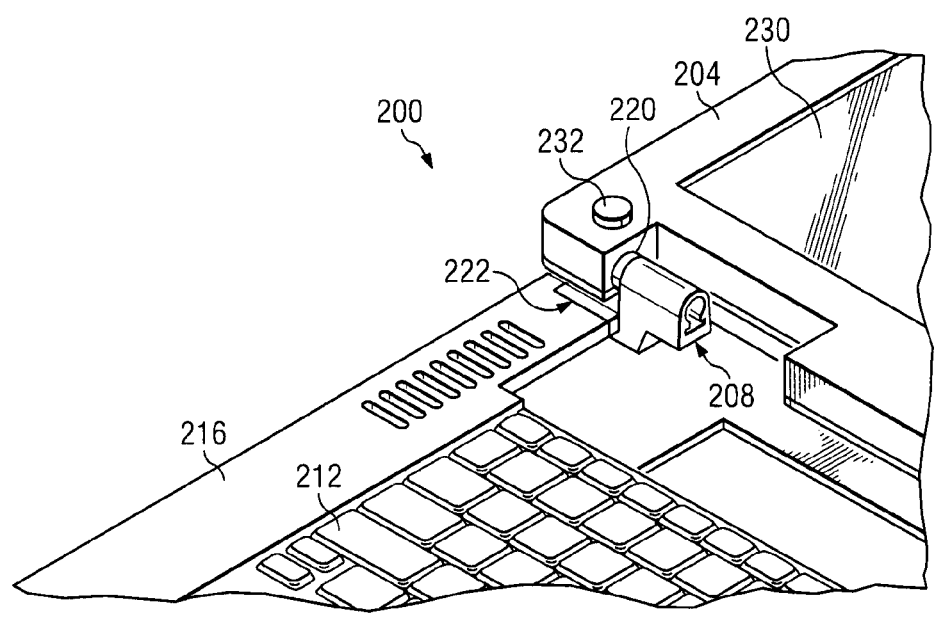
Figure 4D:
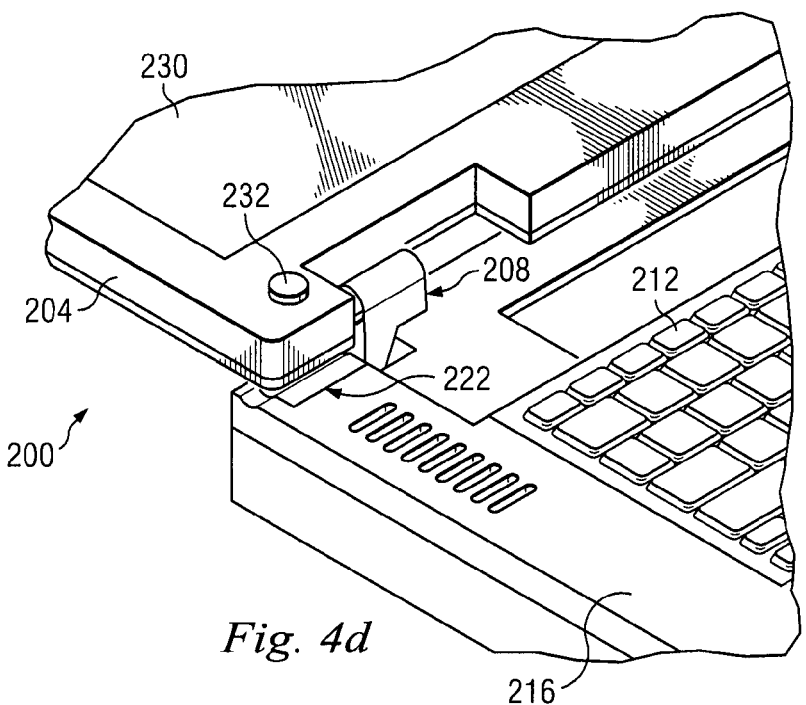
Figure 5A:
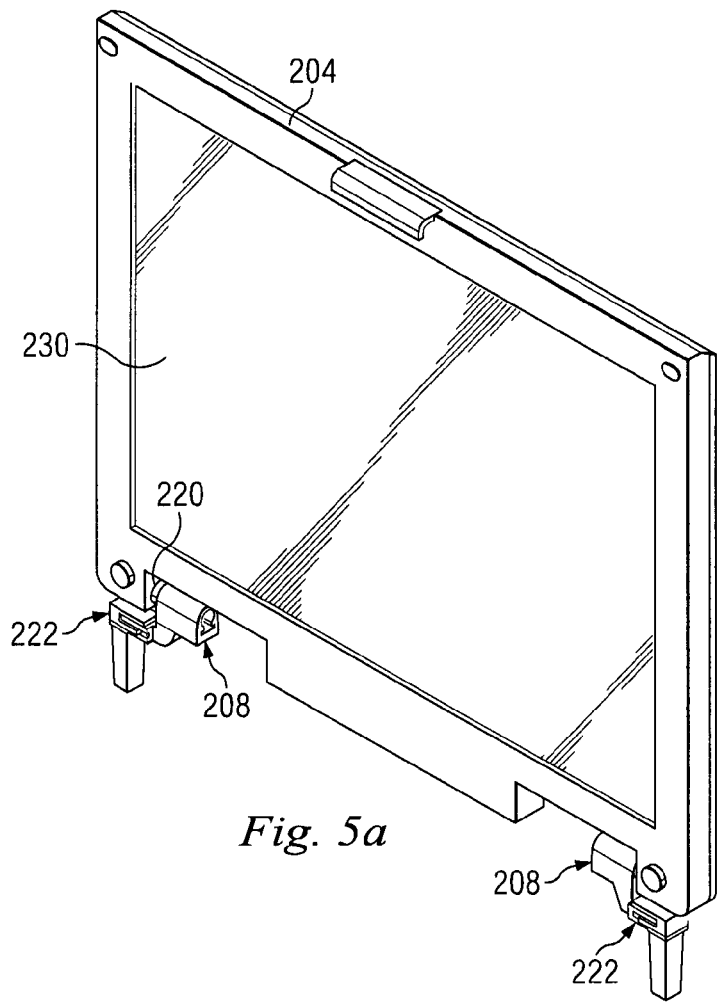
FIGS. 5a and 5b are perspective views of an embodiment of a top panel and hinges of a portable information handling system.
Figure 5B:
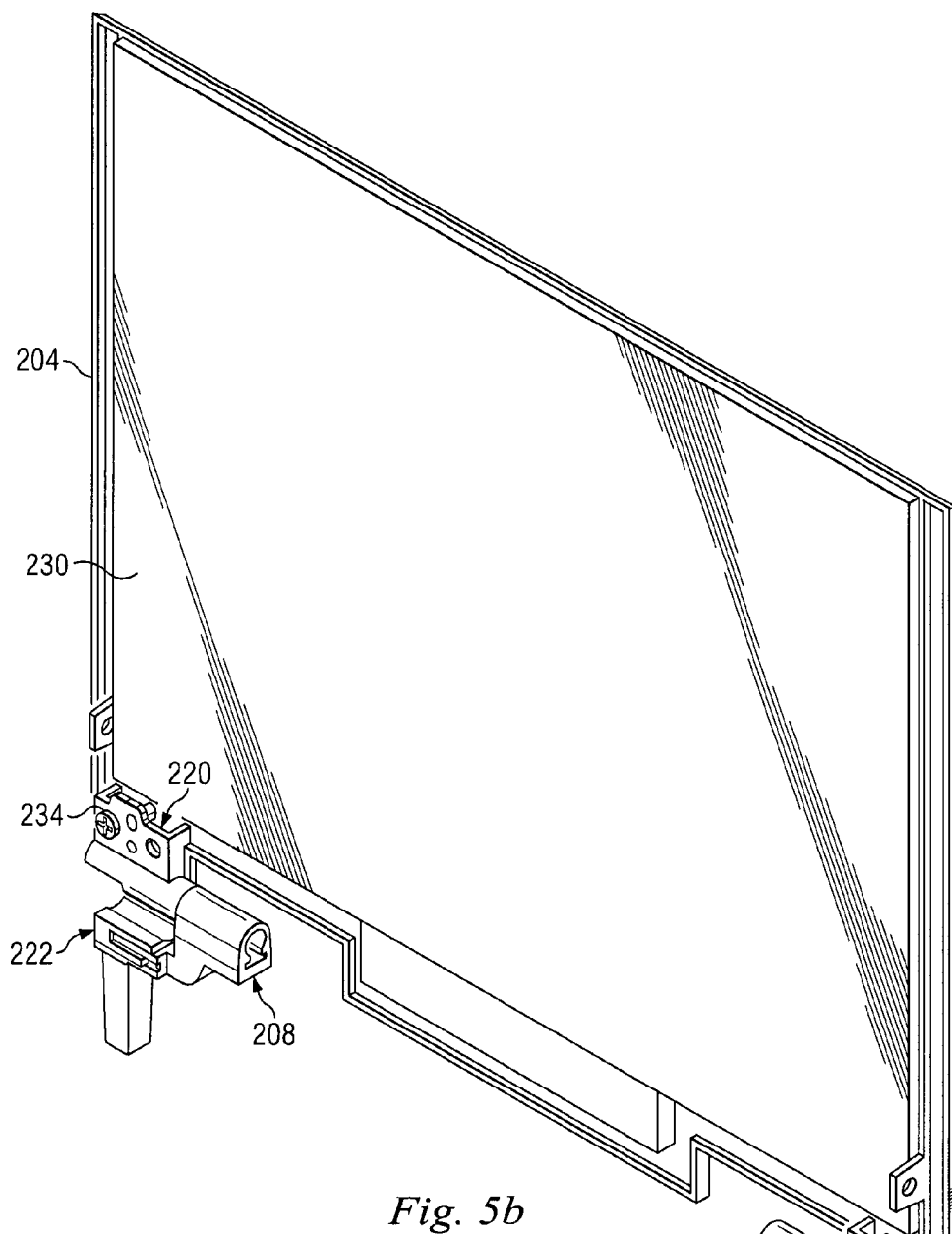
Figure 5C:
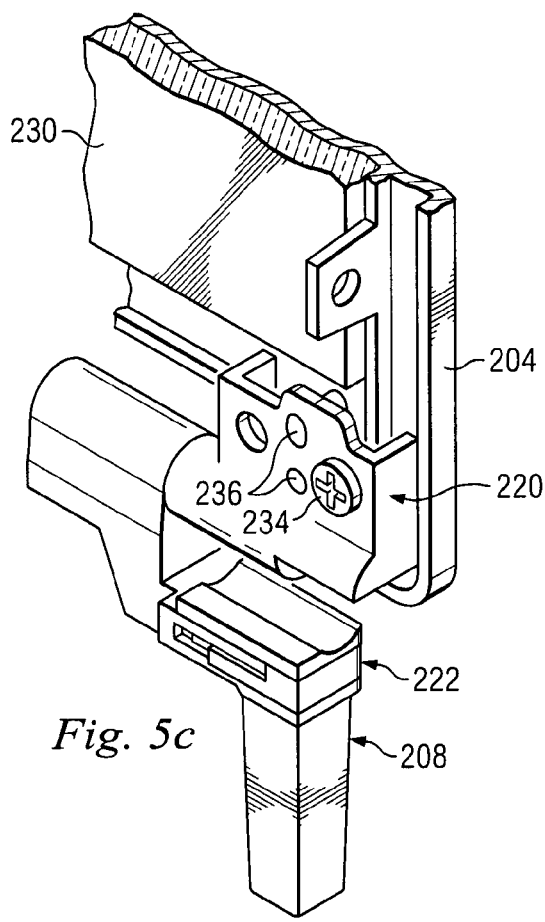
FIGS. 5c, 5d and 6 are perspective views of an embodiment of a portion of a top panel and a hinge of a portable information handling system.
Figure 5D:
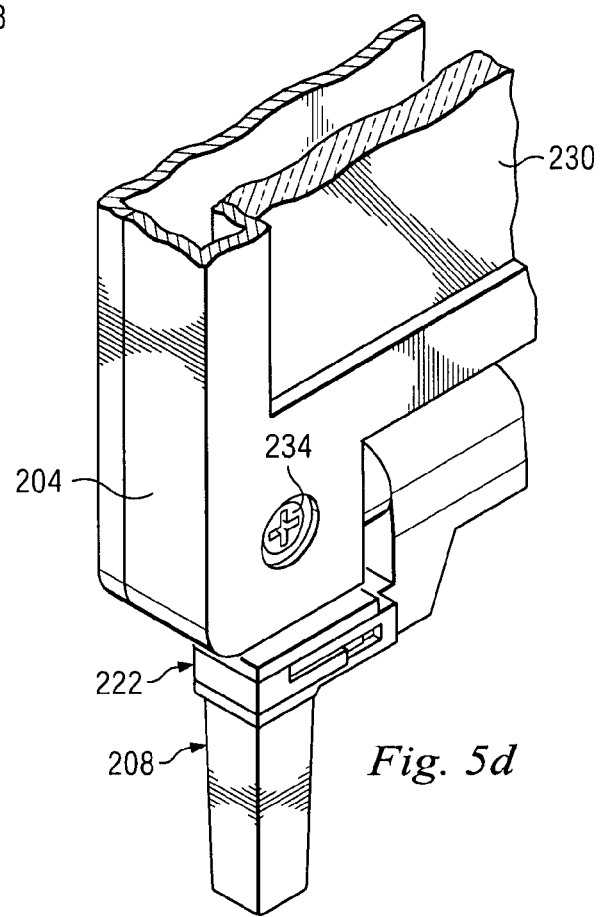

To engage hinge cap 222 with hinge 208, hinge cap 222 is moved in the direction of arrow 660 while deflectable arm portions 328 are received within grooves 316. Hinge cap 222 is moved until male connectors 530 of deflectable arm portions 328 move over protrusions 318, and snap into and engage female connectors 320, respectively. The result is a sliding and snap-in engagement of hinge cap 222 and hinge 208. Although the hinge cap 222 is snapped into engagement with hinge 208, the hinge cap 222 is in a loose or floating engagement with the hinge 208. A combination of features on the hinge cap 222 and on the chassis cover plate 216 can provide the X, Y and Z location of the hinge cap 222 relative to the chassis cover plate 216. For example, when the hinge 208 is mounted in the chassis 206, at least three sides of the hinge cap 222 engage the chassis cover plate 216, as is best shown in FIGS. 4b and 4d. An angled surface 222a, FIG. 10, is provided on a portion of the hinge cap 222 which seats in engagement with a mating angled surface 216a provided on the chassis cover plate 216. It is this mating engagement which determines the X, Y and Z location of the hinge cap 222 relative to the chassis cover plate 216. Another example could include a keyed member provided on one of the hinge cap 222 and the cover plate 216, combined with a keyway on the other mating member. Thus, the location of the hinge cap 222, relative to the chassis cover plate 216, is determined by the chassis cover plate 216 and not the hinge 208. This provides an aesthetically even gap G, see also FIG. 4*b*, between the hinge cap 222 and the chassis cover plate 216.

To disengage hinge cap 222 from hinge 208, deflectable arm portions 328 are bent outwardly to disengage male connectors 530 from female connectors 320. Hinge cap 222 is then moved in a sliding manner in the direction opposite of arrow 660, until deflectable arm portions 328 are no longer received within grooves 316.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be constructed broadly and in manner consistent with the scope of the embodiments disclosed herein.

What is claimed is:

1. A method of assembling a portable information handling system comprising:
   providing a hinge assembly;
   movably interconnecting a chassis to a top panel using the hinge assembly whereby the hinge assembly includes a hinge and a hinge cap;
   including a hinge portion of the hinge having a pair of external opposed grooves and a first locking portion;
   the hinge cap including a pair of external deflecting arms each having a second locking portion,
   removably attaching the hinge cap to the hinge portion by means of the pair of external deflecting arms received by the opposed grooves and the second locking portion received by the first locking portion; and
   mounting the hinge in the chassis so that the hinge cap seats in and defines a gap with a cover plate and the chassis.
2. The method of claim 1, further comprising:
   interconnecting the chassis and the top panel with a plurality of the hinges.
3. The method of claim 1, further comprising:
   mounting a display in the top cover.
4. The method of claim 1, further comprising:
   providing an input in the chassis.
5. The method of claim 1, further comprising:
   releasably securing the chassis and the top panel with a latch.
6. The method of claim 1, further comprising:
   providing a portable power source in the chassis.

* * * * *